United States Patent [19]

Kohn

[11] Patent Number: 4,509,210
[45] Date of Patent: Apr. 2, 1985

[54] TELEVISION RECEIVER ADAPTABLE FOR DESCRAMBLER MODULE

[75] Inventor: Elliott S. Kohn, East Windsor, N.J.

[73] Assignee: RCA Corporation, New York, N.Y.

[21] Appl. No.: 326,159

[22] Filed: Nov. 30, 1981

[51] Int. Cl.³ .................. H04B 1/08; H04N 5/64; H04N 5/44; H04N 7/16

[52] U.S. Cl. .................. 455/349; 455/355; 455/603; 358/114; 358/194.1; 358/254

[58] Field of Search ............. 455/151, 348, 349, 352, 455/353, 355, 603; 358/194.1, 254, 114, 121; 339/17 N, 33; 381/105

[56] References Cited

U.S. PATENT DOCUMENTS

| | | |
|---|---|---|
| 2,691,724 | 10/1954 | Hoffman .................. 358/254 |
| 3,201,653 | 8/1965 | Nuss . |
| 3,272,920 | 9/1966 | Meurer .................. 358/254 |
| 3,304,502 | 2/1967 | Paddock .................. 358/194.1 |
| 3,328,645 | 6/1967 | Becker . |
| 3,555,249 | 1/1971 | Yastrow . |
| 3,708,618 | 1/1973 | Hofmeister et al. . |
| 4,012,672 | 3/1977 | Douglass et al. . |
| 4,070,628 | 1/1978 | Funabashi .................. 455/349 |
| 4,081,831 | 3/1978 | Tang et al. .................. 358/114 |
| 4,131,851 | 12/1978 | Martiny et al. .................. 455/349 |
| 4,297,726 | 10/1981 | Nicholson et al. . |
| 4,343,042 | 8/1982 | Schrock et al. .................. 455/349 |
| 4,368,540 | 1/1983 | Carlson et al. . |

FOREIGN PATENT DOCUMENTS

2411527 8/1979 France .................. 358/124

Primary Examiner—Jin F. Ng
Attorney, Agent, or Firm—E. M. Whitacre; P. J. Rasmussen; R. G. Coalter

[57] ABSTRACT

A television receiver is adapted for use of standardized plug-in descramblers which are coupled to the receiver by a connector. The connector is accessible from the exterior of the housing of the receiver without significant disassembly. The connector has terminals electrically coupled to various key points in the receiver. Each type of descrambler is adapted for descrambling a particular type of scrambled signal, and for that purpose uses certain of the connector terminals. The plug-in descrambler also selects the operating frequency characteristics of the tuner.

6 Claims, 8 Drawing Figures

TELEVISION RECEIVER ADAPTABLE FOR DESCRAMBLER MODULE

This invention relates to television receivers intended for general use for both over-the-air broadcast and for use with cable TV (CATV) systems in which some of the signals may be scrambled.

Television receivers have long been in use for reception of standard broadcast television signals which include both visual portions and aural portions. These standard signals are not scrambled, which is to say that no effort is made to limit their reception. On the contrary, great efforts are made to keep the parameters of the signals within specified tolerances to facilitate reception. Ordinarily, the cost of a television broadcast is defrayed by television advertisers who pay the broadcasters for periodic announcements or advertisements hawking their wares. Recently, to fill a demand for television programming which is not subject to the periodic interruptions for advertising material, other kinds of service have come into existence. One such service is a broadcast or over-the-air service in which the standard signal is processed to make it unviewable on a standard television receiver. This processing is known as scrambling and may involve processing of both the visual and aural portions of the signal. The system operator must provide a descrambler for use in receiving his signal and for converting it to a standard format viewable on a standard television receiver. Another arrangement for supplying signals without the periodic advertisements is CATV. In CATV systems, the signals from a central source or "head-end" are carried over cables to individual subscribers, who connect their television receivers to a terminus of the cable. In such a CATV arrangement, each such subscriber or viewer pays to the CATV system operator a periodic fee for the privilege of remaining connected to the cable so that the signals can be received. More recently, the CATV operators have begun to sell premium services for which an extra fee is required. In order to prevent CATV subscribers already receiving the basic service from receiving the premium service, cable operators have also resorted to scrambling of the premium signals. Not all the television signals carried on a CATV cable are scrambled, for a certain number are provided as a "basic service" provided in return for the basic fee.

In any case, the operator of the system which supplies the scrambled television service must provide the subscriber with a descrambler which converts the scrambled signals into signals which can be viewed with the aid of a conventional television receiver. Often, the descrambler is combined with a frequency converter which, in the case of a CATV system, converts the midband and superband cable channels to one of a few standard broadcast channels which can be processed by the standard television receiver. In the case of broadcast subscription, the converter for the pay channel converts from (typically) a UHF channel to a low VHF channel. These descramblers are very costly, and especially so in view of the tuners which are required for receiving and selecting among the channels including the scrambled channel, and also in view of the power supplies associated therewith, which in turn must be supplied from the AC power lines, thereby requiring an expensive line cord. Additionally, the connection to the AC power line may require Underwriters Laboratories' approval, which may require extensive and costly testing. Furthermore, additional costs associated with the descrambler relate to the need for an acceptably attractive and sturdy housing, switches and controls. Maintenance costs are high on these converter-descramblers because of the high frequency of repairs, which results from physical damage because of their small size and exposed location adjacent to the television receiver.

The tuner-descrambler combination ordinarily converts a cable channel or scrambled broadcast channel to only one preselected standard-broadcast channel. The standard-broadcast channel to which conversion is accomplished is selected to be one on which no local broadcasting is done, in order to prevent co-channel interference. Consequently, the tuning features of the standard television receiver may not be used. For example, a standard television receiver adapted for receiving channels 2-6 and 7-13 as well as UHF channels, 14-83, and which may even be adaptable for receiving cable channels, may have a remote control by which the active channels can be accessed serially or by direct keyboard address. When a converter-descrambler is used, only one channel, such as channel 3, may be available at the antenna terminals of the television receiver, and therefore the remote tuning facility is useless. Another feature currently found on some standard-broadcast receivers is an on-screen numerical display of the selected channel. When the converter-descrambler is used, this display is not inoperative but instead gives an erroneous indication of the channel actually being accessed. That is, the on-screen channel display will always display "03", representing channel 3, no matter what channel is accessed by the converter and converted to channel 3.

Thus, in order to have complete remote control of the television presentation, the present art provides a remote control for the converter-descrambler for controlling the channel being accessed and for control of the descrambling function, together with a remote control associated with the television receiver which in addition to the now-useless control of the tuner and on-screen display, also provides remote control of audio volume, muting, and possibly other functions.

Some scrambling systems require that the descrambler follow the channel converter. For example, those descrambling systems known as "in-band" may have the synchronizing information required for descrambling in the form of amplitude modulation of the aural carrier of the television signal. If the descrambler is not placed at the output of the channel converter, a separate data receiver is required for each channel to be descrambled, and therefore economic necessity dictates the location after the channel converter. Thus, even the present "cable-ready" TV receivers which tune the special non-broadcast channels used by CATV systems, find their tuning and remote control features useless in in-band scrambled CATV systems. Other types of descramblers such as the "out-of-band" type have the synchronizing information required for descrambling modulated onto a pilot carrier outside of the standard broadcast channels. These systems use a data receiver which must be coupled to receive radio-frequency (RF) signals from ahead of the channel converter in order to receive the synchronizing information. Still other systems operate on baseband video. Consequently, it is not apparent how the costs of converters and descramblers can be reduced over the broad range of scrambling systems in the market.

SUMMARY OF THE INVENTION

A television receiver including a tuner, IF amplifier, video detector, nonlimiting and limiting intercarrier sound amplifiers, audio demodulators and de-emphasis circuits includes a connector accessible from the exterior of the housing of the receiver. The connector is electrically coupled to various points in the receiver. A mating jumper is providing which adapts the receiver for receipt of standard nonscrambled broadcast signals. The connector can receive descrambler modules instead of a jumper. Each descrambler module is selected for descrambling a particular type of scrambled signal and needs no tuner. Consequently, the cost of the descrambler is low, and the control functions of the receiver operate normally and are not duplicated when receiving scrambled signals from nonstandard-frequency sources.

DESCRIPTION OF THE INVENTION

Figure 1:
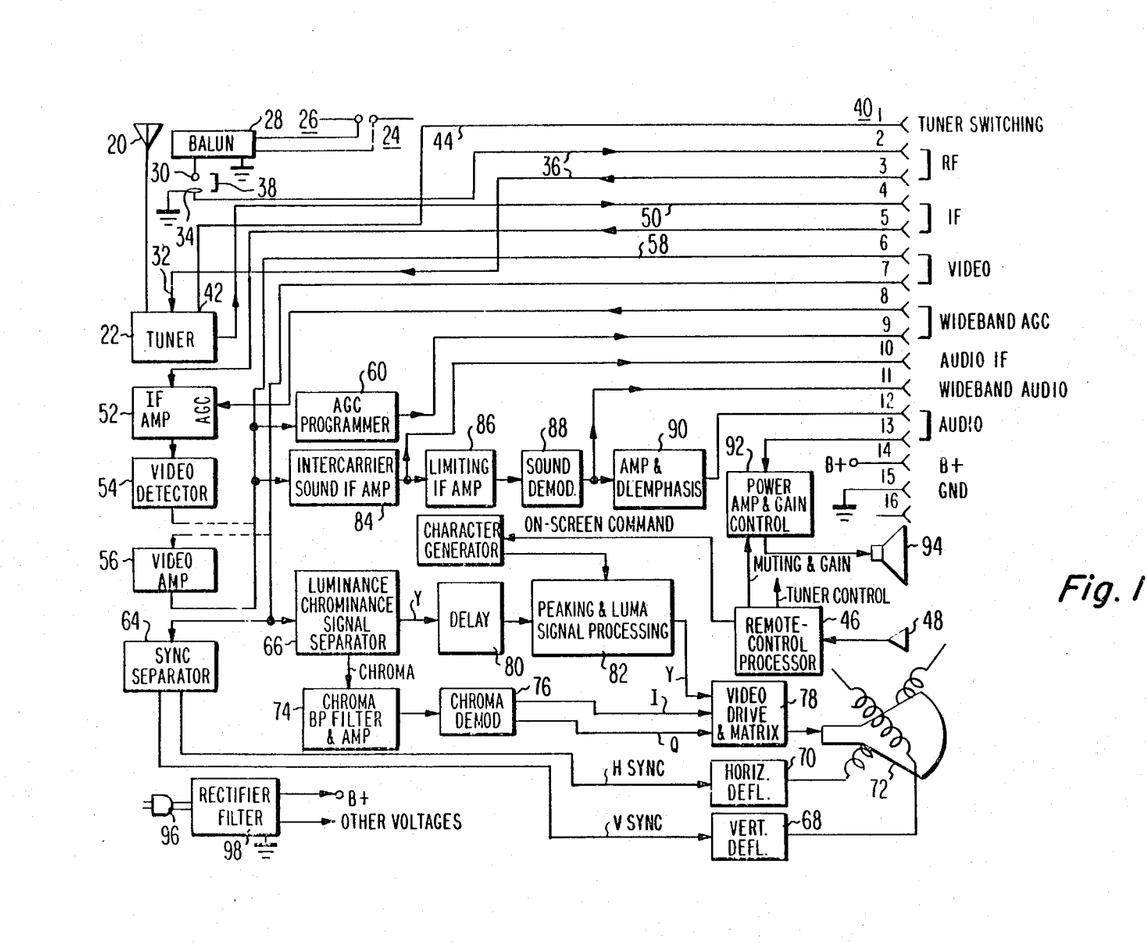
FIG. 1 illustrates in block diagram form a television receiver including a descrambler connector in accordance with the invention.

In the television receiver of FIG. 1, a UHF antenna 20 at upper left of the FIGURE is coupled to a UHF input of a tuner 22. A VHF antenna 24 is coupled by a two-wire transmission line 26 to a balum 28 having an output terminal 30. A VHF, midband and superband input terminal 32 of tuner 22 is coupled to a coaxial receptacle 34 by a coaxial cable 36, the inner conductor of which is coupled by way of terminals 2 and 3 of descrambler connector or jack 40. A jumper 38 is provided for coupling terminal 30 to the center conductor of coaxial receptacle 34 when reception of standard broadcast signals is desired. If cable signals are to be received, jumper 38 is removed and the cable is coupled to receptacle 34.

Tuner 22 includes an input terminal 42 which controls the tuning standard by which the tuner operates. Thus, tuner 22 may operate in one of two states to tune either the standard-broadcast VHF and UHF channels 2-83, or, depending upon the termination applied to conductor 44, the tuner may select VHF channels 2–13, midband channels A-5 through A-1 and A though I, and superband channels J through W and beyond. Such a tuner having two different ranges is described in U.S. patent application Ser. No. 271,742 filed June 5, 1981 in the name of Carlson, et al. Tuner 22 converts a selected one of the applied RF input signals to an intermediate frequency under the control of a remote-control processor 46 (at lower right of FIG. 1). Processor 46 receives control signals from an infrared sensor 48 which receives infrared signals from a remote-control source, not shown. The IF signals produced by tuner 22 are applied by way of a conductor 50 which may be a coaxial conductor to a terminal or pin 4 of connector 40. Pin 4 of conductor 40 is illustrated as being jumpered to pin 5. The jumpers associated with connector 40 in FIG. 1 are jumpers associated with a mating connector illustrated in FIG. 2, and duplicated in FIG. 1 to aid in understanding the invention. The IF signal jumpered to terminal 5 is applied to an input terminal of a controllable-gain IF amplifier 52, which amplifies the signals and applies them to a video detector illustrated as a block 54, which detects the IF signal to produce a composite video signal at an output terminal. The composite video signal is applied to a video amplifier 56 in which the composite video is amplified and from which it is applied by way of a conductor 58 to a terminal 6 of connector 40. The signals on conductor 58 may originate at the output of the video detector rather than at the output of the video amplifier, as shown by the dotted connections. Conductor 58 is also coupled to the input of an automatic gain control (AGC) programmer 60 which may include a low-pass filter for filtering the video signal before it is applied by way of jumpered pins 9 and 8 of connector 40 to an AGC control input terminal 62 of IF amplifier 52.

The video signal on conductor 58 is also applied to pin 6 of connector 40 and is jumpered to pin 7, which is connected to the inputs of the various video signal use circuits, such as a sync separator 64 and a luminance-chrominance signal separator 66. Sync separator 64 separates vertical and horizontal sync signals from the composite video and applies them to various blocks requiring synchronization, and to vertical and horizontal deflection circuits 68 and 70, respectively, which synchronize the deflection of a kinescope 72 with the synchronizing signals. The chroma signals separated from the composite video by separator 66 are applied to a chroma bandpass filter and amplifier illustrated as a block 74. The amplified chrominance signal is applied to a chrominance demodulator 76 which receives subcarrier signals from source (not shown) for producing demodulated I and Q signals which are applied to the corresponding inputs of a video drive and matrix circuit 78. The luminance (Y) signal separated from the composite video by separator 66 is applied through a matching delay 80 to a luminance signal processing circuit 82 which may include peaking circuits. The processed Y signal is applied to a third input of video drive and matrix circuit 78 which produces red (R), green (G), and blue (B) signals which drive kinescope 72.

The detected composite video signal is applied from video detector 54 or from video amplifier 56 to an intercarrier sound IF amplifier 84, which includes a bandpass amplifier tuned to the intercarrier sound frequency. Amplifier 84 has insufficient gain to saturate or limit with a normal input signal. The unsaturated output signal is applied to an "audio IF" terminal 10 and to a second IF amplifier 86 which has sufficient gain in conjunction with the gain of amplifier 84 to saturate on the normal signal in order to reduce AM noise in the demodulated audio signal. The limited output signal of amplifier 86 is applied to a sound demodulator 88 which produces a relatively noise-free wideband audio signal. The wideband audio signal is applied to a "wideband audio" (WB) terminal 11 of connector 40 and to an amplifier and de-emphasis circuit illustrated as 90 which produces an audio signal which is applied to a power amplifier and gain control circuit 92 by way of jumpered audio terminals 12 and 13 of connector 40. Gain and muting control of gain control 92 is accomplished by signals decoded by remote-control processor 46. The gain-controlled audio signal is applied to a loudspeaker 94.

An AC line plug 96 at lower left of FIG. 1 is coupled to a power supply including a rectifier and filter 98 for producing a B+ signal which is applied to terminal 14 of connector 40 for powering modules which may be connected to the connector. Terminal 15 of connector 40 is grounded and terminal 16 is extra.

Figure 2:
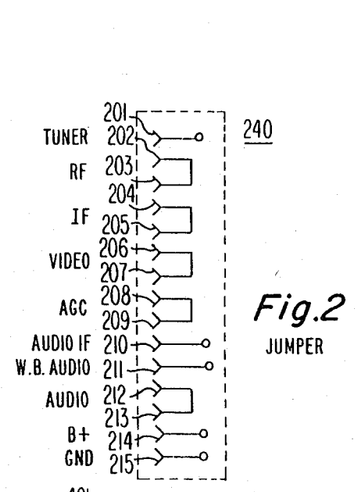
FIG. 2 illustrates in schematic diagram form a jumper adapted for use with the descrambler connector of FIG. 1.

FIG. 2 illustrates in schematic form a jumper 240 having connections corresponding to those illustrated in association with connector 40 in FIG. 1. Jumper arrangement 240 is physically arranged to mate with connector 40. For example, if connector 40 is a 16-position in-line receptacle, jumper arrangement 240 could be a corresponding printed-circuit board with printed jumpers mating with the terminals of the receptacle. On the other hand, if connector 40 is physically in the form of a circular array of sockets, arrangement 240 would be a physically corresponding array of pins suitably jumpered together. As illustrated in FIGS. 1 and 2, the terminal connections are arranged for operation of the receiver for receiving non-scrambled standard broadcast signals. Terminal 201 of jumper 240 is left unconnected, which leaves corresponding terminal 1 of connector 40 open which in turn creates an impedance at terminal 42 which places tuner 22 in condition to receive standard-broadcast VHF channels 2–13 and VFH channels 14–83. RF signals applied to coaxial terminal 34 are coupled by way of terminal 2 to corresponding terminal 202 which is jumpered to terminal 203, and the RF signals are coupled to input terminal 32 of tuner 22 by way of corresponding terminal 3. Similarly, the IF output signal on conductor 50 is coupled by way of terminals 4, 204, 205 and 5 to the input of IF amplifier 52. The output of video amplifier 56 (or the output of video detector 54) is coupled by conductor 58 to terminals 6, 206, 207, 7, and to the various inputs of the circuits using composite sync. The low-pass filtered or narrowband AGC signals from programmer 60 are coupled to AGC input terminal 62 of IF amplifier 52 by way of terminals 9, 209, 208, and 8. Terminal pairs 8, 9 and 208, 209, are called "wideband" because wideband AGC control signals can be applied to terminal 8. The 4.5 MHz intercarrier sound signal is applied by way of terminal 10 to terminal 210. The output of sound demodulator 88 is applied to terminal 11 and corresponding terminal 211. This is termed "wideband" audio in contrast to the audio signal, which has passed through a de-emphasis circuit. The power required for operating modules other than jumper 240 is applied from terminal 14 to terminal 214, which is open on jumper module 240. Terminal 15 is grounded, and corresponding terminal 215 is available as a ground.

Figure 3:
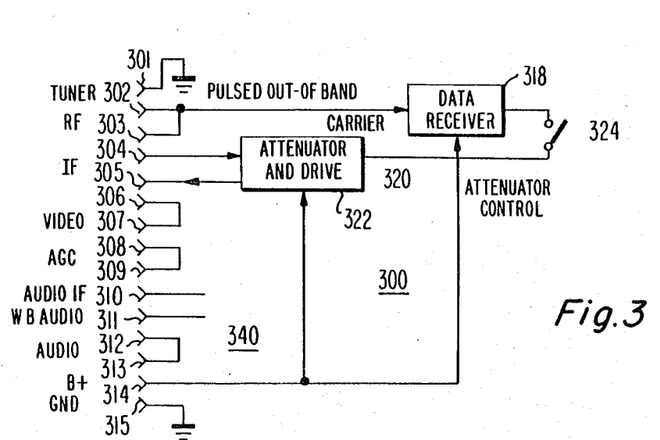
FIGS. 3–7 illustrate various types of descramblers adapted for descrambling different types of scrambled signals, all of which are adapted to be coupled to the descrambler connector of FIG. 1.

FIG. 3 illustrates in block diagram form a descrambler module adapted for descrambling television signals scrambled by suppression of the amplitude of the horizontal (H) synchronizing-signal region in a pulsed manner, where the synchronizing signals required for descrambling synchronization are amplitude-modulated onto a pilot carrier at a frequency far from the channel frequency. Such arrangements occur almost exclusively in CATV systems, since the out-of-band pilot carrier must be recovered by a receiver, and a sophisticated receiver with substantial rejection of interference would be required in the case of over-the-air broadcasting. In FIG. 3, tuner mode control terminal 301 (which mates with terminal 1) is grounded, placing tuner 22 into its second mode of operation in which it tunes the VHF channels 2–13, and the CATV midband and superband channels. RF terminals 302 and 303 are jumpered together so that RF signals can reach input 32 of tuner 22, but a connection is made therefrom to the input of a data receiver 318 so that all of the available RF signals are applied simultaneously to the input of data receiver 318. Among the input signals is the pilot carrier, which may be at a frequency such as 112 MHz. The pilot carrier is modulated with a horizontal-rate pulse signal or a composite horizontal and vertical pulse signal which data receiver 318 processes to produce a pulsed attenuator control signal which is applied to a control input terminal 320 of an attenuator and drive circuit 322 by way of a switch 324. Attenuator and drive circuit 322 is coupled in the IF signal path between terminals 304 and 305, which are coupled to terminals 4 and 5. The attenuator control signal causes periodic changes of predetemined magnitude in the attenuation of the signal between terminals 304 and 305. The predetermined change is often 6dB. The B+ coupled by terminal 14 to terminal 314 is applied to attenuator and drive circuit 322 and to data receiver 318 to supply energizing and bias voltages. Ground terminal 315 is coupled to ground terminal 15 and is also coupled to a ground associated with the descrambler of FIG. 3. More ground connection pins may be required than the single connection shown, in order to minimize the radio-frequency impedance of the ground return. Also, the disposition of the ground terminal or terminals in relation to the radio-frequency terminals may require particular physical locations in order to maintain transmission-line impedances in known fashion. In operation, data receiver 318 responds to the pulses on the pilot carrier and produces changes in the attenuation between terminals 304 and 305 in order to periodically increase the amplitude of that portion of the signals in the vicinity of the horizontal (and sometimes vertical) sync signal relative to the remainder of the signals so as to restore the original shape of the signals so that the sync separator 64 can reliably produce sync signals for synchronization of deflection circuits 68 and 70. Switch 324 may be necessary in certain systems in order to deactivate attenuator 322 in order to view channels other than the scrambled channel. When attenuator control signals are prevented by switch 324 from reaching attenuator and drive circuit 322, it assumes a low-attenuation condition between terminals 304 and 305.

Figure 4:
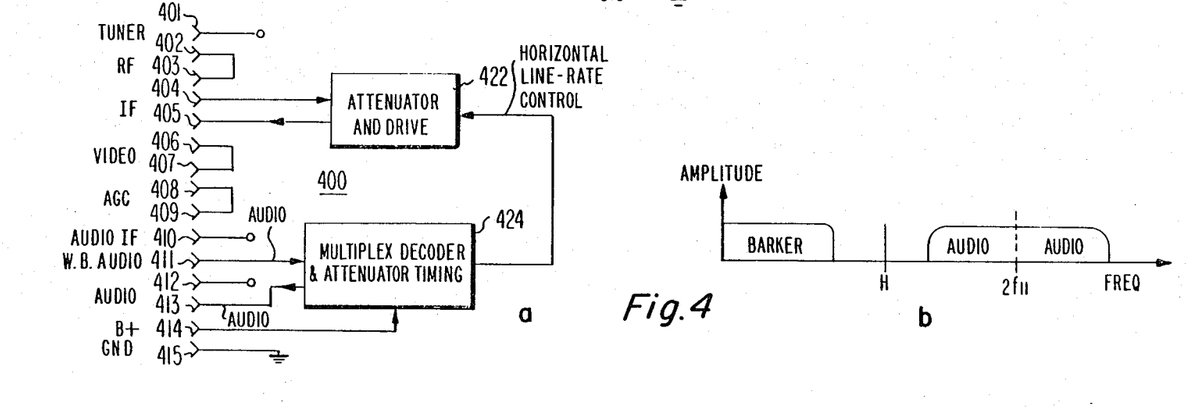

FIG. 4a illustrates in block diagram form a descrambler module 400 for descrambling of video signals scrambled by periodic suppression of the sync regions in a pulsed manner and for descrambling of audio scrambled by being modulated onto a suppressed subcarrier. FIG. 4b illustrates the frequency spectrum of the wideband audio at terminal 411. In FIG. 4b, the demodulated wideband audio includes a low-frequency portion which may be blank or may as illustrated include a barker channel which can be heard on a standard receiver, and it also includes an audio signal modulated onto a subcarrier at a frequency of twice the horizontal line rate ($2f_H$). The audio signal also includes a horizontal-rate sinewave signal to facilitate decoding. Such signals are presently used principally in broadcast or over-the-air subscription or premium service. Consequently, the tuner terminal 401 which mates with terminal 1 is left open, enabling tuner 22 for reception of standard broadcast signals. As in the case of the arrangement of FIG. 3, RF terminals 402 and 403 are jumpered to allow RF signals to pass to the tuner. IF terminals 404 and 405 are not jumpered, but instead pass through an attenuator portion of an attenuator and drive circuit 422 which receives horizontal line-rate control signals from a multiplex decoder and attenuation timing circuit illustrated as 424. Multiplex decoder 424 receives wideband audio information from terminal 411 which is coupled to terminal 11 of FIG. 1. Included in the audio information is a horizontal-rate signal at the horizontal line frequency. The demodulated horizontal sinewave signal is used to control generation of a horizontal-rate pulse train which is applied to attenuator and drive circuit 422 to control the attenuation. The double-sideband suppressed-carrier (DSBSC) audio is demodulated by the use of a phase-lock loop tuned to twice the horizontal frequency. The audio signal so produced is applied to audio terminal 413, which is coupled to terminal 13 from whence it goes through a power amplifier and gain control circuit to the loudspeaker. Since the audio signal is being supplied from the descrambler, the scrambled audio at terminal 12 is not needed, and terminal 412 is therefore left open. B+ is applied by way of terminal 414 to those circuits requiring energization. Descrambler 400 descrambles only when decoder 424 detects a synchronizing pulse, so the operation is automatic and descrambling does not occur when a standard signal is received.

Figure 5:
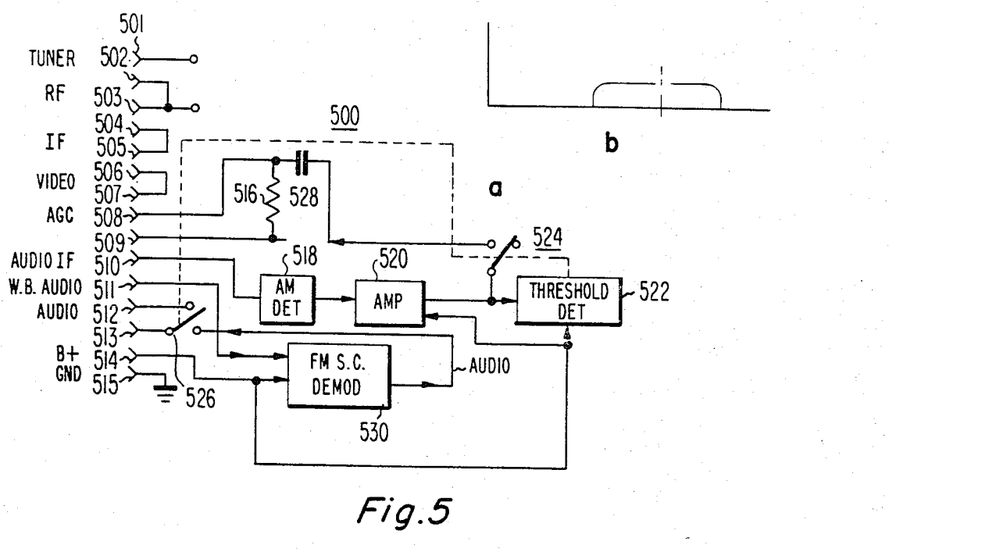

Descrambler module 500 of FIG. 5 is adapted for recovering signals which have been scrambled by suppressing the sync signals with a horizontal-rate sinewave. Normally, the sinewave required for descrambling is amplitude-modulated onto the audio carrier. Descrambler 500 also includes an audio descrambler for descrambling audio signals modulated onto an FM subcarrier. As mentioned, systems in which the audio is also scrambled are ordinarily broadcast channels. Consequently, the operator of a system who supplies a descrambler module 500 would leave terminal 501 open, maintaining tuner 22 in a state adapted for receiving standard broadcast signals. RF terminals 502 and 503 are jumpered, as are IF terminals 504 and 505 and video terminals 506 and 507. Wideband AGC terminals 508 and 509 are coupled together by a resistor 516, which allows AGC signals generated by programmer 60 to be applied to AGC terminal 62 of IF amplifier 52. Audio IF terminal 510 is coupled to an amplitude detector 518 which recovers the amplitude-modulated sinewave superimposed upon the audio carrier. The detected sinewave is applied to an amplifier 520 and to a threshold detector 522. Threshold detector 522 has a high enough threshold so that random noise superimposed on the audio carrier of the television signal will not trigger the threshold, whereas the sinewave intentionally provided during scrambling will trigger the threshold. Threshold detector 522 when triggered by an appropriate sinewave operates switches 524 and 526 from the positions shown to their alternate positions. In the alternate position, switch 524 couples the amplified sinewave from amplifier 520 through a capacitor 528 to terminal 508, the wideband AGC input of the IF amplifier. This closes a feedback loop which tends to reduce the amplitude of the sinewave applied to the audio carrier, by action of the AGC. The AGC action is also impressed upon the video signal which is simultaneously traversing the IF amplifier, with the result that the sinewave sync suppression of the video portion of the signal is eliminated. The wideband audio signal available at terminal 11 and coupled to terminal 511 is applied to an FM subcarrier demodulator for producing the desired audio signal. When receiving unscrambled signals, switch 526 couples terminal 512 to terminal 513 so that the standard demodulated sound can be coupled to loudspeaker 94. When threshold detector 522 detects the presence of a scrambled signal and operates switch 526, terminal 513 is coupled to receive the output of demodulator 530. Consequently, descrambler 500 operates automatically in the presence of a scrambled signal to descramble the signal, and in the absence of a scrambled signal, passes the signal unchanged.

If sinewave scrambling is used on a cable channel by a CATV operator who does not wish to use audio scrambling, descrambler 500 as made available to the subscribers by the CATV operator would lack audio demodulator 530 and would replace switch 526 by a jumper between terminals 512 and 513, thereby reducing the cost of his descrambler.

Figure 6:
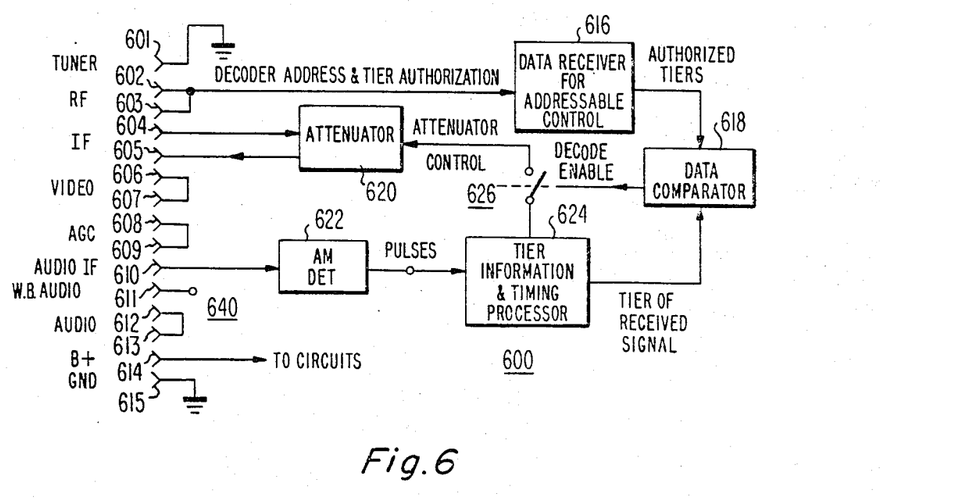

FIG. 6 illustrates a more sophisticated scrambling system than those previously described. The arrangement in FIG. 6 is adapted for descrambling signals organized in tiers of premium service. Since this type of system is used almost exclusively in CATV systems, the operator of the system when supplying a decoder such as 600 supplies it with terminal 601 grounded to adapt the tuner for CATV channels. Terminals 602 and 603 are jumpered, so as to allow RF signals to reach the tuner. A data receiver is coupled to the jumpered RF terminals for receiving an out-of-band data signal. The data signal is transmitted to the particular decoder in a subscriber's home from the head-end of the CATV system. The particular decoder is addressed by a digital number which is hard-wired into a memory associated with the data receiver. When the monthly fee for some level of service has been paid, the data signal addresses the particular receiver and provides information as to which tiers are authorized to be decoded. This information is stored by the data receiver 616 and applied to a data comparator 618. An attenuator 620 is coupled between terminals 604 and 605 for attenuating the IF as in the case of decoder 300. The video, AGC and audio terminals are jumpered. In the scrambling system decoded by decoder 600, information as to the identity (i.e. the tier level) of the television signal being accessed by the tuner is carried as amplitude modulation on the audio carrier of that television signal. The audio IF signal applied to terminal 10 is coupled to terminal 610 and to an amplitude detector 622 which generates digital pulses which together represent the tier of the program and which also carry timing information for control of attenuator 620. The tier information and timing processor 624 decodes and stores the information and applies it to a second input of data comparator 618. If the comparison of the signal then being received is identical with one of the tiers authorized to be received, data comparator 618 produces a decode enable signal which is applied to a switch 626 to enable the timing information to be applied to attenuator 620. In actual practice, the decode enable information is applied to timing processor 624 for purposes of security. Descrambler 600 operates automatically to either descramble the incoming signal depending upon its identification or to not descramble if it is an unscrambled signal.

Figure 7:
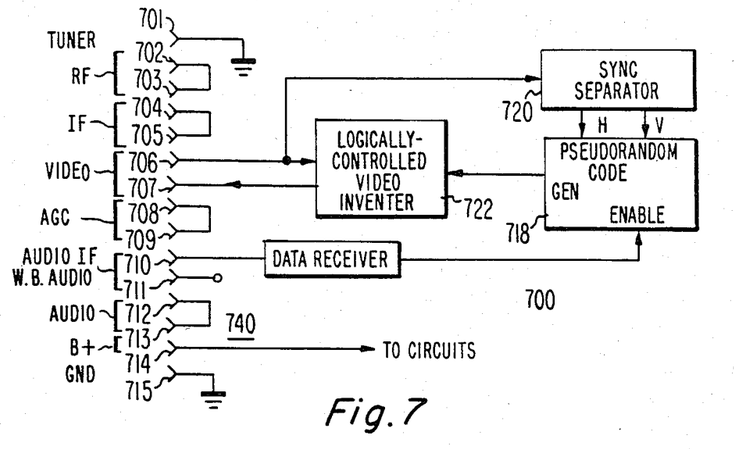

FIG. 7 illustrates a descrambler 700 adapted for descrambling a video signal scrambled by inversion of the polarity of the video signal of particular television lines, where the selection of the lines is based on a pseudorandom code. Such scrambling may be desired where increased security is needed. Generally speaking, the pseudorandom code is stored in a memory which in descrambler 700 is included within a pseudorandom code generator 718. In order to know when to begin the scrambling code, vertical sync signals are applied to generator 718 from a sync separator 720 coupled to receive video from terminal 706 and corresponding terminal 6 of connector 40. Sync separator 720 also provides horizontal sync signals by which the rate of the pseudorandom code is determined. The output signal from generator 718 is applied to a logically-controlled video inverter 722 coupled between video terminals 706 and 707 for inverting the video as required. In order to establish the presence of a scrambled signal, a data receiver is coupled to the audio IF terminal 710 for receiving audio IF signal upon which is amplitude-modulated an identification signal. The data receiver processes the identification signal to produce a generator enable signal which is applied to the enable input of generator 718. Generator 700 also operates automatically in the presence of a scrambled signal to descramble the signal. Otherwise, the signal passes through the system unchanged.

Descramblers 400-700 when used in a television receiver adapted according to a standard for use with modular descramblers effect a great cost-saving to system operators, a portion of which may be passed along to his customers. Furthermore, the descramblers when used as described allow the normal functioning of the receiver remote control, as to the tuner and on-channel display as well as control of audio and other functions.

Figure 8:
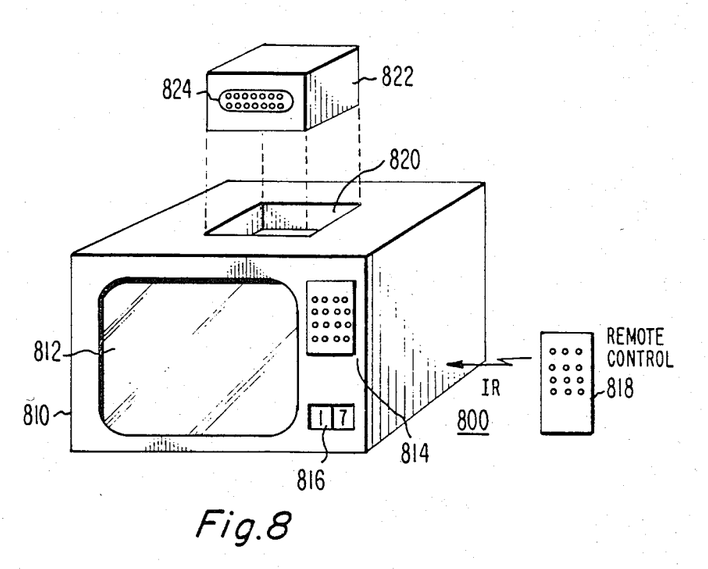
FIG. 8 illustrates a physical arrangement by which a descrambler module may be coupled to a recess in the housing of a television receiver.

The arrangement of FIG. 8 includes a television receiver 800 having a housing 810, a television screen 812, a channel selector and control keyboard 814 and a channel display 816. An infrared remote control unit 818 is illustrated as associated with receiver 800. A recess 820 is formed in the top of housing 810. The recess is of a standard size for accepting a descrambler module 822 which adheres to the standard. Module 822 includes a connector 824 which physically and electrically conforms to the standard, whereby module 822 may be used in conjunction with any standard receiver. Receiver 800 is the property of the homeowner, and may be used for presenting displays from video games, home computers and the like, as well as for presentation of entertainment programming. Module 822 is supplied to the homeowner, either by sale or lease, by the operator of the pay TV service which the homeowner may contract for. The electronics of the standardized descrambler module 822 are chosen by the system operator to descramble the signals contracted for. The remote-control of the homeowner continues to provide the functions which the homeowner expected when he purchased the receiver, and the descrambler is unobtrusively out of sight. The descrambler module costs the system operator much less than would a descrambler together with a tuner and ancillary equipment, for frequency conversion is accomplished by the tuner in receiver 800.

According to the invention, the descrambler connector is coupled to enough points in the television receiver so that a properly designed descrambler taking advantage of the access can be manufactured in an economical manner. Thus, for example, the operator of a CATV system using standard-broadcast channels as well as midband and superband channels, in which some of the channels are scrambled, might have to provide to a subscriber having a cable-ready television receiver a single descrambler module adapted to the type of scrambling in use in the system rather than being required to supply a free-standing tuner-converter and descrambler together with the ancillary power supplies, line cord and the like. It is estimated that the cost saving to the system operator would approach eighty percent. Such a cost reduction by the use of a descrambler adapted for use in a standardized descrambler receptacle in the television receiver is justified if the additional cost in the television receiver were reasonable.

Other embodiments of the invention will be obvious to those skilled in the art. For example, the power supply 98 of FIG. 1 may include voltage regulation, or regulated voltage may be derived from a rectifier-filter associated with a regulated horizontal deflection circuit. The B+power applied to the descrambler connector may be individually voltage regulated and or current limited in known fashion. If the television receiver is of the hot-chassis type in which the chassis may be conductively coupled to one side of the AC power means, the connector may be coupled to the remainder of the chassis by suitable isolation capacitors or by transformers to prevent shock hazard. A separate switch may be coupled to tuner terminal 42 for independent control of the tuner operating state. If reception of off-air scrambled channels together with reception of CATV signals is desired, two or more descrambler connectors may be provided, with their jumpered terminals connected in series.

Physically, the descrambler module may be inserted into the rear of the receiver through a door or removable panel, and the door or panel may have an opening therein to provide access to a switch or other controls associated with the descrambler module.

What is claimed is:

1. A television receiver adapted for use with a plurality of tunerless video signal descramblers, comprising:
   a cabinet for housing components of said receiver;
   a tuner in said cabinet and having an input for receiving a plurality of modulated television signals, said signals occupying both standard broadcast channels and cable televsion channels, said tuner being remotely controllable for selecting a predetermined one television signal from among said plurality and for converting said predetermined one television signal to an intermediate frequency signal, said tuner having an output terminal for providing said intermediate frequency signal thereat;
   an intermediate-frequency signal amplifier in said cabinet for amplifying said intermediate-frequency signal, said amplifier having an input terminal and an output terminal;
   a connector accessible from the exterior of said cabinet, said connector having first and second terminals;
   first coupling means for coupling said output terminal of said tuner to said first terminal of said connector;
   second coupling means for coupling said second terminal of said connector to said input terminal of said amplifier means; and wherein
   said connector is of a type selected to mate with a similar descrambler connector so that when the connectors are mated said intermediate frequency signal is coupled from said tuner to said amplifier via said connector thereby enabling descrambling of said intermediate frequency signal prior to amplification by said amplifier.

2. A television receiver including a remote-controlled audio volume control comprising:

audio carrier demodulator means for demodulating an audio carrier for generating an audio signal;

a loudspeaker to which amplified audio signals are applied;

controllable volume control means coupled to said audio carrier demodulator and to said loudspeaker for controlling the amplitude of the audio signal applied to said loudspeaker;

remote-control means coupled to said controllable volume control means for remotely controlling said controllable volume control;

a connector including first and second terminals coupled in the path of the audio signals between said demodulator and said loudspeaker; and removable jumpering means coupled to said first and second terminals for forming a path between said terminals for the flow of said audio signals therebetween; and wherein said first and second terminals are coupled in said path of said audio signals at a point between said demodulator and said volume control means whereby said remote control operates normally to control the volume of said audio signal when said jumpering means is replaced by an audio descrambler.

3. A television receiver for use with an audio descrambler, comprising:

a cabinet for housing components of said receiver;

audio carrier demodulator means for demodulating an audio carrier for generating an audio signal;

a loudspeaker to which amplified audio signals are applied;

a connector accessible from the exterior of said cabinet and including first and second terminals coupled in the path of the audio signals between said demodulator means and said loudspeaker;

jumpering means coupled to said first and second terminals for forming a path between said terminals for the flow of said audio signals therebetween, said jumpering means being removable for replacement by said audio descrambler for descrambling said audio signals in said path; and volume control means coupled to said audio carrier demodulator means and to said loudspeaker for controlling the amplitude of the audio signal applied to said loudspeaker, said volume control means being coupled in said path of said audio signals downstram from said connector whereby said volume control means operates normally to control the volume of said audio signal when said jumpering means is replaced by said audio descrambler.

4. A television receiver according to claim 3 wherein said volume control means includes a control portion external to said cabinet of said receiver and a slave portion within said cabinet.

5. A television receiver according to claim 4 wherein said control portion is coupled to said slave portion by transmission means.

6. A television receiver according to claim 5 wherein said transmission means includes an infrared transmission portion.

* * * * *